United States Patent [19]

Cornwell et al.

[11] Patent Number: 4,945,721

[45] Date of Patent: Aug. 7, 1990

[54] ELECTROMAGNETIC CONVERTER FOR REDUCTION OF EXHAUST EMISSIONS

[75] Inventors: James H. Cornwell, Raleigh, N.C.; William J. Kukla, Boulder, Colo.

[73] Assignee: Environmental Research International, Inc., Boca Raton, Fla.

[21] Appl. No.: 181,625

[22] Filed: Apr. 14, 1988

[51] Int. Cl.[5] ............................................. F01N 3/08
[52] U.S. Cl. ...................................... 60/274; 60/275; 204/168; 204/173; 204/177; 422/168; 423/212
[58] Field of Search .................. 60/275, 274; 423/212; 422/168, 169, 186.04; 204/168, 173, 177

[56] References Cited

U.S. PATENT DOCUMENTS

| | | |
|---|---|---|
| 3,100,146 | 8/1963 | Huntington . |
| 3,157,479 | 11/1964 | Boles . |
| 3,526,081 | 9/1970 | Kusters . |
| 3,534,547 | 10/1970 | Mebes . |
| 3,620,008 | 11/1971 | Newbold . |
| 3,623,295 | 11/1971 | Shriner . |
| 3,736,727 | 6/1973 | Shriner . |
| 3,771,736 | 11/1956 | McKinley . |
| 3,979,193 | 9/1976 | Sikich . |
| 4,098,578 | 7/1978 | Stanton . |
| 4,304,096 | 12/1981 | Liu et al. . |
| 4,316,360 | 2/1982 | Liu et al. . |
| 4,348,784 | 7/1982 | Liu et al. . |
| 4,355,504 | 10/1982 | Liu et al. . |
| 4,376,637 | 3/1983 | Yang . |
| 4,380,900 | 4/1983 | Linder et al. . |
| 4,478,613 | 10/1984 | Brettschneider et al. . |
| 4,587,807 | 5/1986 | Suzuki ................................. 60/275 |
| 4,649,703 | 3/1987 | Dettling et al. . |
| 4,689,951 | 9/1987 | Polach . |

*Primary Examiner*—Douglas Hart
*Attorney, Agent, or Firm*—Brumbaugh, Graves, Donohue & Raymond

[57] ABSTRACT

An electromagnetic converter directs the exhaust stream of a fossil fuel combustion process, for example the exhaust from an internal combustion engine, through a series of electrostatic fields to convert a substantial portion of the pollutants into non-harmful base elements. In an exemplary embodiment, the exhaust stream is directed through an anti-turbulator chamber, which conditions the flow. The chamber includes an electron transfer grid in the path of the flow. The grid has a negative dc charge of sufficient strength to achieve the first ionization level of the HC, CO, and $CO_2$ molecules present. The ionized exhaust is thereafter directed to an ion generator chamber, which includes coils carrying a very high positive dc charge, e.g. 20,000–50,000 volts dc, sufficient to achieve ionization potential of the molecules to induce molecular breakdown into the base components of carbon, hydrogen, and oxygen. From the ion generator chamber, the exhaust is directed to a collector chamber which collector surfaces connected to a positive dc ground or otherwise configured to induce polar covalent bonding of the carbon ions. The resulting gases emitted contain substantially reduced levels of HC, CO, and $CO_2$, and very high levels of pure oxygen, as compared to present catalytic converters.

31 Claims, 3 Drawing Sheets

ELECTROMAGNETIC CONVERTER FOR REDUCTION OF EXHAUST EMISSIONS

FIELD OF INVENTION

The present invention relates to apparatus and methods for the reduction of pollutants, particularly those resulting from the combustion of fossil fuels. The invention will be described by example of devices and methods for reducing emissions from internal combustion engines.

BACKGROUND OF THE INVENTION

Automobile emissions, as well as the emissions from buses, trucks and other mobile sources utilizing internal combustion engines, continue to be an extremely serious problem, not just in this country but worldwide. Exhaust emissions contain not just solid pollutants, i.e., carbon particulates, but also toxic gases such as carbon monoxide, irritants such as hydrocarbons, oxides of nixtrogen ($No_x$), and carbon dioxide. While carbon dioxide is not harmful in itself, the carbon dioxide output from growing worldwide combustion of fossil fuels has resulted in an alarming increase in the level of carbon dioxide in the atmosphere, with a concurrent drop in the level of oxygen. The rise in $CO_2$ level has manifested itself in concern over creating a potentially catastrophic "greenhouse effect".

Mobile sources, specifically automobiles, are considered to be the source of over 75% of the visible air pollution in the United States today. Principally in response to the ongoing harmful effects of uncontrolled fossil fuel emissions, both to humans and the environment, the United States began in the 1970's to force states to impose limits for exhaust emissions in its cars. Most states today require periodic emissions testing of automobiles registered within the state.

In order to meet these emissions standards, most passenger vehicles sold in the U.S., starting from the 1975 model year, have been equipped with catalytic converters. These devices contain a catalytic agent, e.g. one of the noble metals such as platinum, palladium, or rhodium.

Catalytic converters utilize the heat of the exhaust which, promoted by the catalyst, induces chemical reactions in the gases to convert some of the hydrocarbons and harmful pollutants i.e. carbon monoxide, into other compounds such as carbon dioxide and water. The catalysts are present within the housing in one of two forms, monolith (honeycomb structure) or pellets. There are basically two types of catalytic converters, oxidation and three-way. Oxidation converters, which rely on platinum or palladium as the catalyst agent, remove only CO and HC, leaving $No_x$ unchanged. Three-way converters, which act on CO, HC, and $NO_x$, rely upon platinum, palladium, or rhodium as a catalyst, and in addition require that the engine air-fuel ratio be maintained at, or very near, stoichiometry under all vehicle operating conditions.

At highway speeds, the better catalytic converters are relatively efficient, operating in the range of about 90% efficiency. However, the devices are far from a satisfactory solution to the emissions problem.

As noted before, catalytic converters require heat in order to operate. When the engine is cold or is idling, the efficiency of the converter drops substantially. In fact, estimates show that a major percentage of the emissions in the country occur during idle and cold start, where the catalytic converters are not very effective.

Another serious drawback of catalytic converters is that they require the use of unleaded gasoline. As is well known, unleaded gasoline is more expensive to produce, has lower octane ratings than its leaded counterpart, and gives lower gas mileage. While U.S. consumers have somewhat reluctantly resigned themselves to the use of catalytic converters and unleaded fuels, with the concomitant poor performance and gas mileage that accompanies such use, other countries, for the most part, have not.

Another drawback of catalytic converters is the required use of noble metals such as platinum, palladium, or rhodium. Such metals are rare and thereby expensive. Moreover, the supply of such metals is limited to a few countries, and demand for such metals is growing, and thus there may not be a reliable source for such metals in the future. Further, maintaining effective catalytic function over long period of vehicle operation can be a problem. Catalytic activity will deteriorate due to poisoning of active sites by contaminants, such as lead and phosphorous, and due to exposure to excessively high temperatures. Thus, not only must the vehicle be operated strictly with unleaded fuels, but proper engine maintenance must be followed.

A 1987 published study by the EPA showed that 48% of the cars and light duty trucks in this country are spewing an "unacceptably high" amount of pollution. The reason: malfunctioning emissions equipment.

It is clear that the catalytic converter will not in itself provide a sufficient long term control of air pollution. The EPA has set tougher emissions requirements that will not be met by current catalytic converter systems. What few steps are being taken, e.g. the use of smog pumps or EGR valves, will only make the smog control system more complex and expensive, with little in the way of any real improvement.

Recently, Colorado mandated the use of oxygenated fuels, either corn based ethanol or ether-based MTBE for part of the year to try to reduce the carbon monoxide level on the east slope of the Rocky Mountains. The blended fuels cost about three cents more per gallon to make, and some believe that such fuels, at least if used with a higher content of oxygenated additives, will have negative effects on performance and may cause mechanical problems in the engine.

There have been a great many other proposals for reducing the level of pollutants in exhaust gases, based on the idea of using electrical fields to ionize particles. These proposals fall into several categories.

One approach has been to establish a corona discharge in the flow path of the gases, i.e., to bombard the gases with electrons. An example of this type of device is disclosed in U.S. Pat. No. 4,380,900 assigned to Robert Bosch GmbH. As do most of these patents, the Bosch device attempts to remove particulate matter (soot) only. One patent, Sikich U.S. Pat. No. 3,979,193, sets up an alternating current corona discharge to set up an ozone field that, according to the inventor, acts to convert carbon monoxide into carbon dioxide. He does not indicate the degree to which this occurs, but if in fact ozone is created and emitted such would be extremely undesirable.

Other types of devices employ electrostatic or alternating current fields without corona discharge, but once again these devices are intended, for the most part, to ionize and trap particulates. For example, Lui U.S. Pat. Nos. 4,304,096, 4,316,360, 4,338,784, and 4,355,504 propose devices with particle collector plates, charged to several thousand volts dc, to collect electrically charged particles in diesel exhaust gases. In Yang U.S. Pat. No. 4,376,637, carbon particles in diesel exhaust are vaporized by a dc voltage grid and oxidize to form carbon dioxide. Stanton U.S. Pat. No. 4,098,578 discloses a device which adds water, hydrogen peroxide, or alcohol to the exhaust gases and then subjects the mixture to an intermittent DC field to ionize the unburned hydrocarbons and additives. Newbold et al. U.S. Pat. No. 3,620,008 discloses a device that subjects the exhaust stream to a high frequency electrical field of about 10,000 volts AC. A charged graphite scepter is provided in the inlet to set up an ignition plasma reaction, in which the gas stream is heated to about 10,000° F.

None of these proposals involving the use of electrostatic, alternating current, or corona discharge fields have been adopted by the automobile industry. As noted above, to the extent the industry has adopted any emission treatment device, it has been the catalytic converter.

SUMMARY OF THE INVENTION

The present invention relates to devices and methods that represents a significant breakthrough in treatment of pollutants, particularly in the reduction of hydrocarbon and carbon monoxide exhaust emissions resulting from fossil fuel combustion processes.

A preferred embodiment of the invention is an electromagnetic converter for automobiles and other motor vehicles using internal combustion engines. The device, which is self-contained in a housing that can be connected into the exhaust line, is intended for use both in gasoline engines and in diesel fuel engines, as well as engines operating on other types of fuels.

According to the present invention, the exhaust stream is directed, under controlled conditions, through a positive electric field of a sufficient strength to induce molecular breakdown in the exhaust gases, i.e. to break down the molecules into their base components, and the gases are held in this energized state as the exhaust stream is thereafter directed in to a carbon bonding chamber. There, the carbon ions bond, by polar covalent bonding, to the walls of the collector and the remaining gases, in the form of oxygen, nitrogen, and hydrogen, are discharged to atmosphere. The devices according to the invention are effective in converting a significant portion of the oxygen present in pollutant compounds (CO, $CO_2$ and $NO_x$) into the more desirable form of pure oxygen.

In one embodiment, the device includes a housing with three successive chambers: first, an anti-turbulator chamber which includes a grid negatively charged on the order of 6 kv dc; this chamber conditions the flow and adds energy; second, an ion generator chamber with a positive charge on the order of 50 kv dc that breaks down molecules of CO, $CO_2$, HC and $NH_4$ into component ions and radicals with unpaired electrons; and third, a collector chamber to induce polar covalent bonding of the carbon particles.

In accordance with the present device and method, hydrocarbons, carbon monoxide and carbon dioxide are broken down molecularly into carbon, hydrogen and oxygen. The collector housing acts to hold the atoms in a radical state, instead of recombining as CO and $CO_2$, as the charged carbon particles are collected in the collector. The resulting emissions have considerably reduced levels of hydrocarbons, CO, and $CO_2$ compared to even the best catalytic converters on the market. Moreover, and importantly, the level of pure oxygen emitted from the exhaust is substantially higher than with a catalytic converter, meaning that internal combustion engines can be run, unlike engines today, with far less of an effect of reducing levels of oxygen in the atmosphere.

Perhaps even more significant, the present invention is extremely efficient not just at some engine operating states, like a catalytic converter, but over the full range of engine operation, that is, the device works not just at highway speeds but also at idle and even at cold start conditions.

For a better understanding of the invention, reference is made to the following detailed description of preferred embodiments, taken in conjunction with the drawings accompanying the application.

DETAILED DESCRIPTION OF THE PREFERRED EMBODIMENTS

Figure 1:
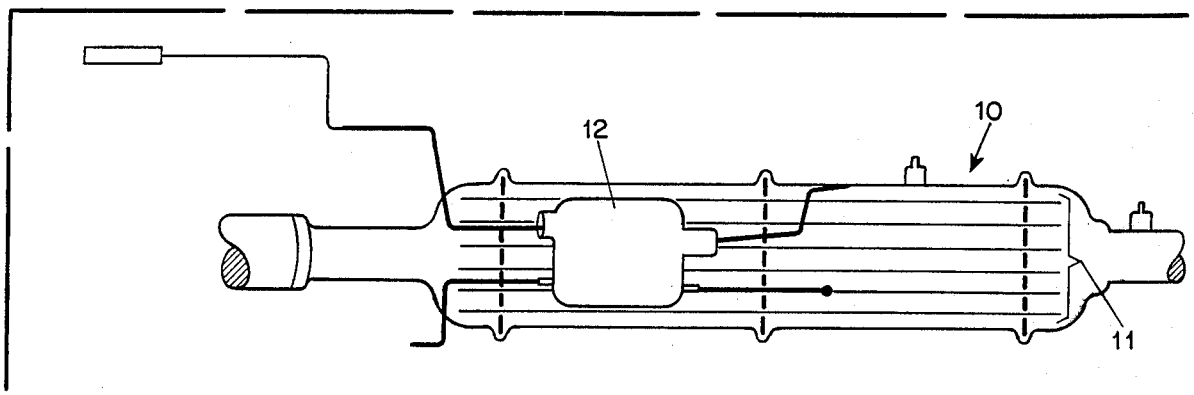
FIG. 1 is a side view of an electromagnetic converter according to the invention.
Figure 2:
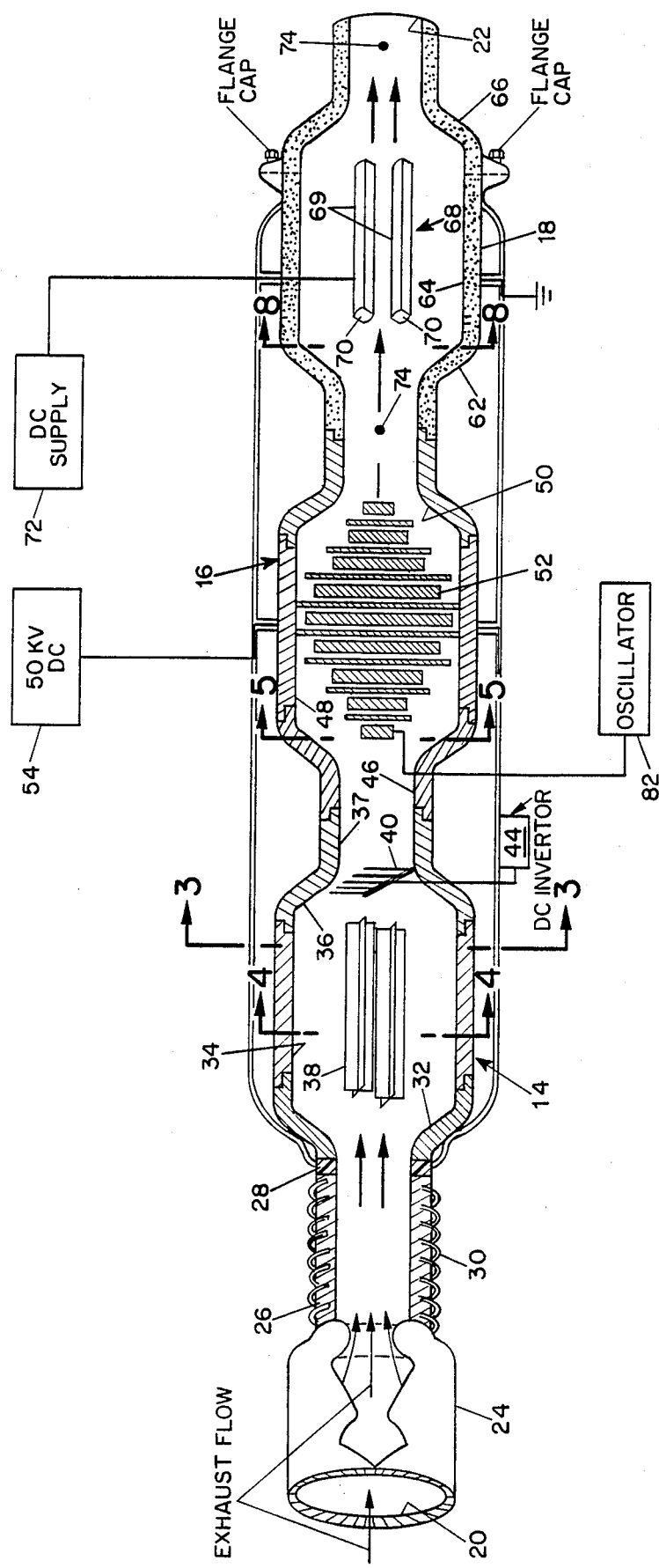
FIG. 2 is an isometric sectional view of a first embodiment of electromagnetic converter according to the invention.

Referring to FIGS. 1 and 2, an electromagnetic converter includes an outer housing 10, a voltage source housing 12 mounted thereon, and an inner housing configuration made up of an anti-tubulator housing 14, an ion generator chamber housing 16, and a carbon bonding chamber 18.

Outer housing 10 is generally cylindrical in configuration, and is formed of a non-conductive material such as delron or other dielectric materials. A plurality of cooling fins 11 may be formed on the housing to reduce temperature.

As shown in FIG. 2, exhaust enters the device through an inlet 20 and exits through an outlet 22 after first passing through the axially aligned chambers 14, 16, and 18 which, as described below, act to substantially reduce the level of pollutants in the exhaust stream.

Inlet pipe 24 is arranged to connect to a tailpipe (not shown) of an internal combustion engine, preferably downstream of the muffler. The inlet pipe 24 connects to an induction pipe 26, with a smaller diameter, that in turn is connected to the inlet of the anti-tubulator housing 14, for example with a labrinth ring 28. Optionally, a heat exchanger, in the form of an array of circumferentially extending cooling pipes 30, surrounds the induction pipe 26. The cooling pipes 30 may be connected to a source of coolant such as freon, which is circulated through the pipes 30 to absorb heat and then air cooled at a remote location.

Figure 4:
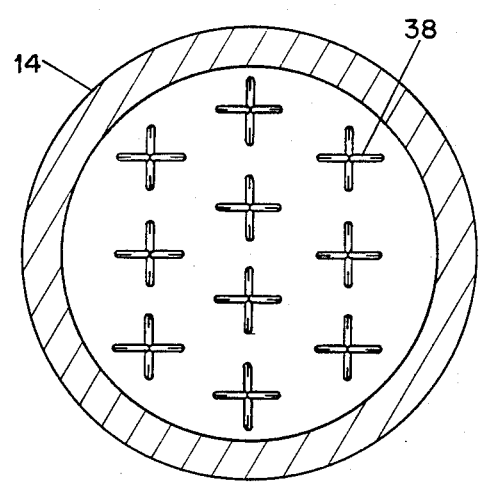

The anti-turbulator housing 14 includes a conical shape divergent inlet 32, a cylindrical chamber 34, and a conical shape convergent outlet 36. By way of example, the cylindrical chamber 34 has an inner diameter of 4 inches, with the conical members 32, 36 at opposite ends decreasing in diameter to 2 inches. As shown, a plurality of elongated, axially oriented anti-turbulation flow guides 38 are arranged in the anti-turbulator chamber 34. As shown in FIG. 4, the anti-turbulation flow guides 38 have a crossshape profile and are spaced across the flow area. In this example the anti-turbulator housing has a length of about 9.5 inches.

The purpose of the anti-turbulator flow guides 38 is described further on. It has been found that an electromagnetic converter having an anti-turbulator housing with the dimensions disclosed herein, when used with an automobile engine, does not require such guides. But, such guides may be desirable in other applications or in housings with different dimensions.

Figure 3:
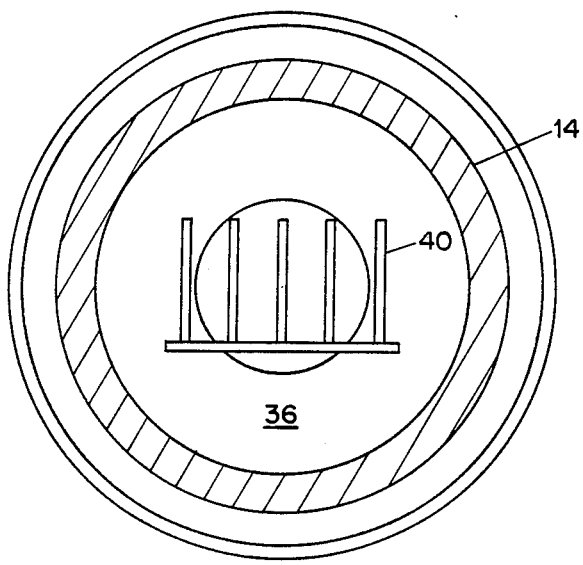
FIGS. 3, 4, and 5 are cross-sectional views of the device of FIGS. 1-2 taken through lines 3—3, 4—4, and 5—5 of FIG. 2, respectively.

An electron transfer grid 40 is disposed in anti-turbulator housing 14 in the conical shape convergent outlet 36. The grid 40, which is shown more clearly in FIG. 3, is in the form of a plurality of vertical pins 42 spaced across the opening 50 as to lie substantially across the entire flow path of the exhaust gases. The pins are preferably about 0.060 inch in diameter, 1.5 inches in height, and spaced apart from one another a distance of 0.250 of an inch. In this example, 5 pins are employed. Grid 40 is connected to a negative 6 kv dc source, for example provided by DC invertor 44.

The ion generator housing 16 includes a conical shape divergent inlet 46, a cylindrical chamber 48, and a conical shape convergent outlet 50. The inlet 46 of the ion generator housing 16 is, as shown, connected to the outlet 36 of the anti-tubulator housing 14, and chambers 34 and 48 are axially aligned. A coil ion generator unit 52 is disposed in the ion generator housing 16, and is connected to 50 KV DC source 54, which is housed in the voltage source housing 12. Voltage source 54 may include a high energy Tesla coil, which is powered off the 12 volt alternator of the engine and an operational amplifier, however any voltage source will do. It has been found that, in spite of the high voltage, the coils draw little current, on the order of 5 milliampheres, and therefore draws little power from the engine electrical supply.

Figure 5:
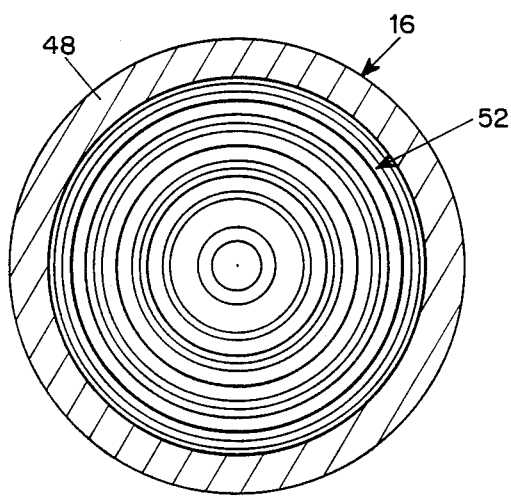
Figure 6:
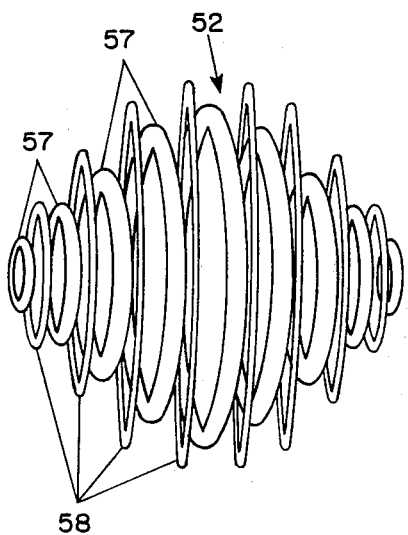
FIG. 6 is an isometric view of the ion coil structure of the FIGS. 1-2 device.
Figure 7:
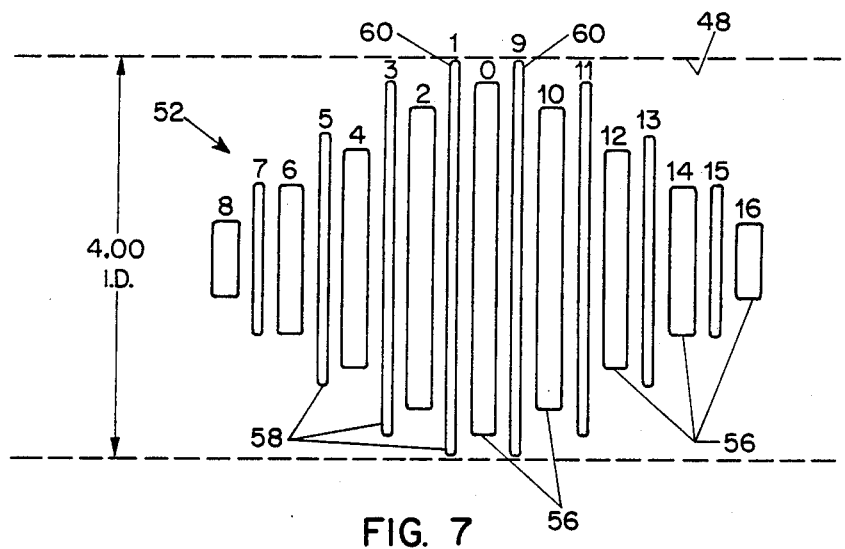
FIG. 7 is a side, diagramatic view of the coil ring spacing.

A preferred embodiment of a coil ion generator 52 is shown in greater detail in FIGS. 5, 6, and 7. As shown in FIG. 6, the coil array is in the form of a double series of nine thicker 56 and eight thinner 58 donut shaped coils. The coils in each series increase in diameter, in the axial direction, to a maximum at the center of chamber 48 and then decrease, so as to be symmetrical about the chamber midpoint. The rings in the thinner series 58 of coils are larger in diameter than the thicker coils 56 lying to either side. Although not shown the coils 52 are attached to one another by connecting pieces to be supported in the positions shown. Preferably, the coils and connecting pieces are made of oxygen free copper, but any good conductor may be utilized instead. The middle coils 60 of the series 58 are supported by the non-conducting cylinder wall 48.

In the illustrative embodiment, the ion generator cylindrical housing 16 extends axially approximately 9.5 inches and has an inner diameter, in cylindrical chamber 48, of 4 inches. Coil generator 52 is approximately 5.7 inches in overall length. Coils 60 are approximately 3.75 inches in diameter and are secured to the wall of chamber 48 by insulating supports. The thicker rings 56 are uniformly spaced and increase linearly in size from 1.5 to 3.5 inches; the thinner rings 58, which are also uniformly spaced, increase linearly in size from 3 inches to 3.75 inches. As can be seen in FIG. 5, the rings effectively cover most of the cross-sectional area such that the exhaust flow will pass in very close proximity to the coils 52. The arrangement of coils shown in FIGS. 5-7 establish a maximum air gap of 0.125 inches which provides effective ionization of the gases, as described below.

Carbon bonding chamber 18 also includes a conical shaped divergent inlet 62, a cylindrical chamber 64, and a conical shape convergent outlet 66 leading to the outlet end 22 of the device. As in the case of the anti-turbulator housing 14 and ion generator housing 16, the inner diameter of the chamber 64 is 4 inches, and the conical portions 62, 66 effect a transition to a 2 inch inner diameter.

An ion collector unit 68 is disposed in the carbon bonding chamber 18, providing a plurality of ion collectors 69, two of which are shown in FIG. 2, with elongated passages 70 through which the exhaust is directed. The ion collectors 69 are connected to the positive ground of a 12 volt DC supply 72. A pair of oxygen sensors 74 may be provided upstream and downstream, respectively, of the ion collector unit 68.

Figure 8:
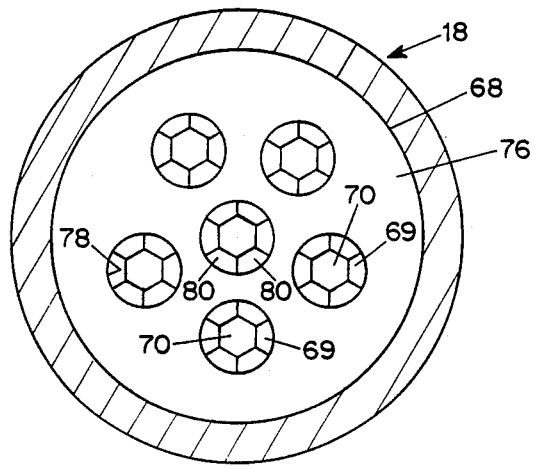
FIG. 8 is cross-sectional view of the collector section of the FIGS. 1-2 device, taken through lines 7—7 of FIG. 2.

FIG. 8 shows an embodiment of the ion collector unit 68 in more detail. A transverse plate 76, which blocks the chamber 64, has a plurality of openings 78, in which the ion collectors 69 are positioned. The ion collectors 69 are each made up of six plates 80 that define the openings 70 as hexagonal shaped. A sufficient number of collectors 69 are provided so that the flow may pass unimpeded (without any significant back pressure) through the carbon bonding chamber. By way of example, six collectors, having openings 70 of 0.375 inch to 0.750 inch diameter, may be used. Preferably, plate 76 is made of non-conductive material and plates 80 are made of a conductive material such as copper or other good conductors of electrical current with very low resistance. A graphite coating may be used over the copper conductor to set up a carbon-to-carbon bond and therefore enhance the collection efficiency of the plates. Oxygen sensors 74 may be used to sense the level of oxygen and provide a feedback signal to the ion generator, for increasing field strength responsive to a drop in oxygen output.

As shown and discussed above, in this embodiment the inlet pipe 24, induction pipe 24, anti-turbulator housing 14, ion generator housing 16, and carbon bonding chamber 18 are axially aligned from the inlet 20 to the outlet 22 of the device. Preferably, the anti-turbulator housing 14, the ion generator housing 16, carbon bonding chamber 18, the flow guides 38 (if used), and the outer housing 10 are all formed of a non-conductive material, such as Delron. Induction pipe 26 and inlet pipe 24 are preferably formed of metal to provide better heat exchange for temperature reduction, which will improve ionization. Thus, the only metals used in the main portion of the device are the electron transfer grid 40, the coil ion generator 52, the ion collectors plates 80, and the wiring leading to these elements.

OPERATION OF THE ELECTROMAGNETIC CONVERTER

The emission reduction process is initiated by directing exhaust gases from an internal combustion engine or other combustion process into the anti-turbulator housing 14, which is constructed to hydrodynamically condition the exhaust stream and establish a laminar flow condition.

Exhaust gases entering the anti-turbulator housing 14 expand from a diameter of 2 inches at the inlet side of conical inlet 32 to 4 inches at the cylindrical chamber 34. At the outlet 36, the flow of gases, through a Bernoulli effect, is angularly accelerated toward the central axis, as it reaches the discharge port 37. Thus the convergent outlet 36 acts to increase the velocity of the exhaust stream and condense or compact the particulates along an angular path. By reducing the diameter thus at the outlet 36, the amplitude of sinusoidal movement of the exhaust particles (due to intermittent discharge of the individual piston cylinders) can be controlled, and laminar flow is induced at the discharge port 37.

The relationships among velocity, flow, and pressure are important in constructing a chamber that will induce laminar flow in the exhaust stream. It has been found that using conical sections of about 4.00 inches length, 45° angle, and expanding and subsequently constricting the diameter of the flow between 2 and 4 inches, will result in relatively stable, laminar flow in the exhaust of an automobile engine. However, other geometries may be employed. Also, in the case of engines producing other flow rates or pressures, it may be helpful to employ flow guides 38 or other such devices. Preferably such devices, if used, would not produce increased back pressure on the engine.

In a preferred construction of the invention where a heat exchanger 30 is employed, the cooling coils will promote particle condensation in the exhaust flow and lower thermal temperature before the gases enter the electron transfer unit.

As the exhaust flow passes through the conical shape convergent outlet 36 of the anti-turbulator housing, it encounters the electron transfer grid 40. The grid 40 is charged to a negative 6 KV DC electrical potential supplied from the AC to DC converter 44. Because the walls of the housing 14 are non-conductive, the grid 40 produces no corona discharge, but rather establishes an electrostatic field of sufficient strength and proximity to the flow to elevate the outer valence electrons in the atoms to the first ionization level, thus removing the valance electrons and ionizing the molecules of the gases and particulates. The energized exhaust flow then passes out the discharge port 37 and into the ion generator housing 16.

Coils 52 are positively charged at a very high potential, on the order of positive 50 KV DC. Field power for the ion generator 52 may be supplied, as noted above, from a solid state Tesla coil mounted on the exterior housing 10 of the converter. The outlet current from the Tesla coil is fed through an operational amplifier to the coil 52.

Exhaust gases entering the induction side of the ion generator are subjected, due to the convergent/divergent nozzle effect of conical portions 36, 46, to an abrupt friction line loss which occurs as a result of the increase in diameter in the divergent conical inlet 46. As a result, there is a force in phase balance that occurs, as represented by the conservation of momentum equation:

$$Q_2 = Q_1 + \int_o^t \frac{dQ}{dt}.$$

The boundary layer of the exhaust flow is disrupted and driven into a state of turbulent flow. As the boundary layer of the exhaust begin to break up its encounters the positively charged rings 52, which are interposed across virtually the entire flow path. The disruption of the boundary layer and induction of turbulent flow ensures a more complete ionization.

Because the exhaust flow has been hydrodynamically conditioned to achieve a laminar flow state, and is angularly accelerated along a horizontal plane, solids in the air stream are compacted together, and velocity is increased, in convergent nozzle 36 with only a minor reduction in temperature. It is desirable that the solid particulates are compacted in this manner and thereby more dense in the chamber prior to contact with the ion generator.

As the exhaust gases flow through the ion generator 52, the electromagnetic energy is sufficient to reach the ionization potential of all molecules in the exhaust, both gases and particulates. This uses surprisingly little current, on the order of only 5 milliampheres, and can be powered by the conventional alternator on the engine. The resultant effect is to create a state of molecular breakdown of the pollutants. For example, molecules of carbon dioxide entering the converter as

```
    o o                              o o
o        o    •    •    o       o       o
    O              C              O
o        o    •    •    o       o       o
    o o                              o o
``` first form $CO_2$ ions in the electron transfer grid 40, and then, upon entering the ion generator are broken down molecularly into ions of oxygen ($O_2$) and atoms of carbon (C). The same reaction takes place for molecules of carbon monoxide CO and water $H_2O$.

Ammonia present in the exhaust stream is also broken down. Ammonia is converted to ammonium ions ($NH_4^+$) in the electron transfer grid 40. In the ion generator 52, the ions are then broken down molecularly into the base atoms, hydrogen (H) and nitrogen (N).

The energy levels required in the ion generator were projected based upon the Lorentz law of the transformation of energy. The Lorentz transformation, which involves mass per unit time, is represented by the formula:

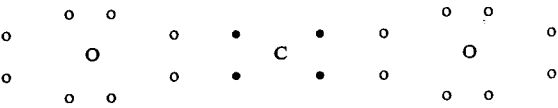

In the embodiment of the electromagnetic converter described herein, field strengths of between +20 KV DC and +50 KV DC are required to produce this breakdown of molecules in the ion generator, the minimum field strength required being a function of the velocity and volume of the exhaust transmission. At higher velocity, because the molecules are in the presence of the field for a shorter period of time, and at higher particle volumes requiring more energy per unit time, higher field strengths, i.e. nearer the 50 KV end or higher, may be needed to achieve full molecular breakdown. Concomittently, it may be possible to reduce the required field potential by increasing the length of the field so that molecules are in the presence of the high energy field for a longer period of time.

The dissimilar field potentials set up by the electron energy transfer unit 40, having an electrostatic field, and the ion generator unit 52, having an electromagnetic field, produce a radical condition that acts to break down the molecular structure of the gaseous molecules in the exhaust, i.e., $HNO_2$, $NO_2$, $CO$, $Co_2$, and $H_2O$, into their base atomic components of hydrogen, nitrogen, carbon, and oxygen, and also minimizes any recombination of atoms. The gaseous effluent, with the entrained solid carbon particulates, are directed into the ion collector unit 68 which, as described above, is formed of a plurality of radially positioned, axially extending hexagonal shaped tubes 69 in the direct line of the exhaust flow.

The ion collectors 69 are connected to a 12 volt DC positive ground charge feed from a regulated 12 VDC supply 72 located on the exterior cylindrical housing 10 of the converter. As the exhaust stream passes through the ion collectors 69, the charged carbon particulates form polar covalent bonds on the carbon surface walls of the ion collectors 69 because of the electromagnetic effect, opposite charges attracting, like charges repelling. Thus, the carbon particulates are highly positive in charge, whereas the surface walls of the collector, which are connected to a 12 volt positive ground, are in relative terms, negative (less positive) in charge, and therefore current flows positive to negative inside the source. The carbon particles see the 12 volt charge as a negative, and as a result, the carbon particles separate out from the ionized gases, which pass through the collector and are discharged to atmosphere.

In the case of oxygen, when subjected to the electromagnetic field a phenomenon occurs that is similar to a paramagnetic effect, however cold temperatures and blue coloration do not exist. The effect on oxygen can be represented by the following notation, indicating an unpaired group of electrons:

```
        o         o
  o         o         o
        O         O
  o         o         o
        o o     o o
```

It is critical to configure the fields of the ion generator unit 52 and collector 68 to ensure that wholesale recombination of the base atoms and oxygen ions does not occur. The structure in FIG. 2 effectively minimizes conditions that would promote atoms to recombine although some recombination will inevitably occur. It has been found that the tendency of the ions to recombine can be reduced further by providing a field shunt switch 82 to oscillate the electromagnetic field energy discharged from the ion generator. Tests have shown that oscillating the field can increase the output level of xygen by about two percent, which is of itself extremely desirable.

Shunt switch 82 is connected electrically to the coils 52 and to a 200,000 ohm resistor, so that the field oscillates between 50 KV and 20 KV. Preferably the switch operates at a frequency of 120 HZ. The shunt switch may be operated by an atmosphere-sensitive pressure sensing device, which controls the switch 82 by making or breaking the electrical contacts in the shunt switch. A solid state shunt switch may also be used without conventional contacts.

As noted before, the field strength required to achieve molecular breakdown may vary at different engine operating conditions. If desired, oxygen sensors may be employed to monitor the incoming and output oxygen levels. Such values can be compared to stored values of expected converter performance, to increase the field strength when oxygen generation falls below normal range.

Carbon atoms, which bond to the walls of the ion collector, eventually build up, requiring collector replacement. Tests to date indicate an average life expectancy, when used on automobiles, of 40,000 hours. The life expectancy can be controlled by the diameter of the tubes.

A converter according to the invention was tested on an automobile engine for emissions reduction. The unit tested was as shown in FIGS. 1-8, except that the unit did not contain the inlet pipe 24, induction pipe 30, heat exchanger 30, flow guides 38, or oxygen sensors 74. The conical inlet 32 was connected directly to a 2" exhaust pipe. The electron transfer grid was connected to a negative 12 KV DC source, the coil ion generator 52 was connected to the output of a Tesla coil, fed through an operational amplifier, to provide positive 50 KV DC, and collector tubes 69 were connected to positive ground of a 12 VDC source. All of the electrical units were powered off the engine alternator.

TESTS FOR CO, $CO_2$, HC EMISSIONS

The test engine was a 1985 4 cylinder Chevrolet engine, as used in its Chevette model. Engine exhaust was directed through a muffler to a multi-port valve, to direct the exhaust selectively into one of three output lines: (1) one containing a factory original monolithic 2 stage catalytic converter, model 4735-8903; (2) one with no catalytic converter (straight exhaust); and (3) a line containing the electromagnetic converter unit. The emissions content of the exhaust gases was measured using a Baer Gas Analyzer Model 42-926. This unit and related models are currently accepted equipment for most state emissions inspections.

In general, the testing demonstrated that the electromagnetic converter significantly reduces the level of emissions in the engine exhaust, in comparison to even a top-of-the-line catalytic converter. In representation tests, at idle speeds, hydrocarbon emissions were reduced by about 65%., carbon monoxide emissions were reduced by about 95%, and carbon dioxide levels were reduced by about 50% over the catalytic converter. Oxygen output was increased by 600% using the electromagnetic converter, from levels in the range of 2.2% for the catalytic converter to 10-12% or higher (atmosphere contains approximately 20.9% oxygen).

Even at higher rpm's, where catalytic converters are most efficient, the electromagnetic converter provided a significant improvement, reducing hydrocarbon levels by about 65%, carbon monoxide levels by about 60%, and carbon dioxide levels by about 35% relative to the catalytic converter. Oxygen output was doubled.

The following sections contain the results of several test runs. The performance results of the electromagnetic converter was found to be reproduceable to the same degree as the results for the catalytic converter (i.e. readings will change some depending upon ambient conditions and instantaneous engine performance, but within such parameters the results are reproduceable).

COLD START

As discussed in the background section, cold start represents a worst case for engine emissions. The test engine was started cold and readings of the exhaust emissions from the electromagnetic converter taken for idle conditions with results as follows:

|  | IDLE | North Carolina IDLE SPECIFICATIONS (MAX.) |
|---|---|---|
| HC (PPM) | 50 | 220 |
| CO (%) | .06 | 0–1.2 |
| $CO_2$ (%) | 6.3 | 6.6–16 |
| $O_2$ | 10 | 9.9 |

The specification for HC and the upper limit on the range for CO and $CO_2$ represent the maximum permissible levels of such emissions at idle. As can be seen, the invention is well within requirements even for worst case engine performance. In the case of the specification for oxygen, the oxygen level in the exhaust was higher than spec. Such number only represents a theoretical upper limit for oxygen emission, used for checking analyzer malfunction. Prior to this invention, known exhaust pollution reduction devices were not able to produce oxygen outputs above (or even close to) this level. In the remaining tables, the oxygen specification will be omitted, since the only significance is that the oxygen levels produced by the invention are greater than anything previously anticipated as possible.

COMPARISON ANALYSIS TEST

In this test, the engine was fine tuned, and the air-to-fuel ratio adjusted, to produce the lowest emissions level that could be achieved for the catalytic converter and straight exhaust. The engine was then tested for all three systems in this state (it was not retuned to run effectively with the electromagnetic converter). Emissions readings were taken successively for straight exhaust, catalytic converter, and electromagnetic converter outputs and were was follows:

|  |  | STRAIGHT EXHAUST | 2 STG. MONO CATALYTIC CONVERTER | ELECTROMAGNETIC CONVERTER | IDLE SPEC (MAX) |
|---|---|---|---|---|---|
| IDLE | HC (PPM) | 118 | 103 | 61 | 220 |
| 900 | CO (%) | 1.94 | 1.76 | 1.04 | 0–1.2 |
| RPM | $CO_2$ (%) | 12.8 | 12.6 | 7.7 | 6.6–16 |
|  | $O_2$ (%) | 2.2 | 1.5 | 7.1 |  |
| HIGH | HC (PPM) | 60 | 51 | 35 |  |
| RPM | CO (%) | 2.14 | 2.13 | 1.54 |  |
| (1500) | $CO_2$ (%) | 13.3 | 13.0 | 10.1 |  |
|  | $O_2$ | 2.6 | 2.2 | 3.2 |  |

In a similar comparison test, in which the engine was tuned as a best case for the engine and catalytic converter, results were as follows:

| IDLE (700 RPM) | STRAIGHT EXHAUST | 2 STG. MONO CATALYTIC CONVERTER | ELECTRO-MAGNETIC CONVERTER |
|---|---|---|---|
| HC (PPM) | 98 | 90 | 47 |
| CO (%) | 1.1 | .5 | .35 |
| $CO_2$ (%) | 12 | 13.2 | 6.5 |
| $O_2$ | .4 | 2.2 | 10.6 |

TWO HOUR TEST

In this test, the engine had previously been tuned for operation with the electromagnetic converter. The engine was started cold and run over a period of two hours at idle speed, with a set of readings taken at approximately 15 minute intervals. At approximately the midway point, the ground shunt 82, which had been off, was turned on. The following readings were obtained.

|  | COLD START | AFTER 5 MIN. (SHUNT OFF) | SECOND HOUR (SHUNT ON) | IDLE SPEC (MAX) |
|---|---|---|---|---|
| HC (PPM) | 32 | 31–40 | 44–45 | 220 |
| CO (%) | .07 | .04–.07 | .05–.06 | 0–1.2 |
| $CO_2$ (%) | 6.6 | 3.7–6.6 | 5.5–5.8 | 6.6–16 |
| $O_2$ (%) | 11.1 | 11.0–16.2 | 12.1–12.3 |  |
| RPM | 833 | 792–839 | 748–782 |  |

COMPARISON TEST AFTER TWO HOUR RUN

Following the two hour idle run, North Carolina State Inspection Tests were carried out on the exhausts from the electromagnetic converter, catalytic converter, and straight exhaust. The results are summarized below:

|  | ELETRO-MAGNETIC CONVERTER | STRAIGHT EXHAUST | MONO 2 STG. CAT. CONV. | SPEC |
|---|---|---|---|---|
| IDLE | (PPM) |  |  |  |
| HC (PPM) | 38 | 220 | 115 | 220 |
| CO (%) | .06 | 3.13 | 1.18 | 0–1.2 |
| $CO_2$ (%) | 6.2 | 11.8 | 13.5 | 6.6–16.00 |
| $O_2$ (%) | 10.6 | 2.3 | 2.6 |  |
| HIGH RPM |  |  |  |  |
| HC (PPM) | 12 | 48 | 35 |  |
| CO (%) | .36 | 1.09 | .97 |  |
| $CO_2$ (%) | 9.2 | 13.3 | 14.2 |  |
| $O_2$ (%) | 5.7 | 2.8 | 2.8 |  |

TESTS FOR $NO_x$ EMISSIONS

The Baer Unit is not equipped to read $NO_2$ levels and thus separate tests were conducted to measure $NO_x$ (which results from $NO_2$ emission) emissions. Tests taken on the catalytic converter indicated emissions levels of $NO_2$ at 140 ppm (parts per million). In contrast, in readings taken for $NO_2$ on the electromagnetic converter the output of $NO_2$ was below 10 ppm. Thus, such tests verify that a substantial portion of $No_2$, that would otherwise form $NO_x$ once emitted, is instead broken down molecularly in the electromagnetic converter and emitted instead as nitrogen and oxygen.

As both series of tests demonstrate, the electromagnetic converter produces exhaust emissions that are well below specifications, and are significantly reduced compared to the known catalytic converter at both idle and high speed conditions. Moreover, the level of oxygen produced with the invention is beneficially increased.

A device according to the embodiment of FIGS. 1-2 is relatively compact and can be incorporated easily into the exhaust line of automobile engines. Because heat is not necessary to the conversion process (in fact is not desired), the housings can be formed of plastics and thus readily and inexpensively produced by molding. As shown in FIG. 2, each of the housings 14, 16, and 18 may be formed by a pair of cone members that interfit with a respective cylinder member, e.g. 34, 48, or 64, but other constructions may be employed.

ALTERNATIVE EMBODIMENT

Figure 9:
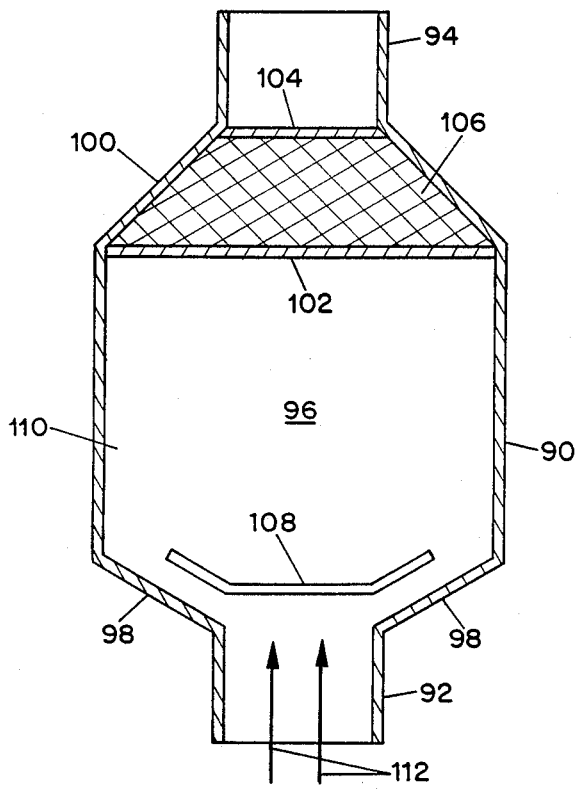
FIG. 9 is a top, sectional view of a second embodiment of the invention.

FIG. 9 shows one alternative embodiment of the invention which includes a non-conductive closed housing 90 with an inlet pipe 92, that connects to engine exhaust, preferably downstream of the muffler, and an outlet pipe 94 that discharges to atmosphere. The top wall 95 and bottom wall 96 are flat, and a pair of diverging walls 98 define an enlarged ionization chamber 110. Outlet end 100, which is separated by a gas permeable wall 102, converges in width to join outlet pipe 94. A second, gas permeable wall 104 is disposed at the juncture of the outlet end 100 and outlet pipe 94 to define a collector chamber 106.

An ionization plate 108 is disposed at the entrance of the ionization chamber 110, in the path of the incoming flow, indicated by arrows 112. The plate extends substantially the height of the ionization chamber 110 and is fixed thereto. A pair of backswept wing portions 114 follow the profile of the diverging walls 98 so as to present a larger contact surface area for the flow. Plate 108 is connected to a source of positive voltage on the order of 50 KV DC.

Collector chamber 106 is connected a positive ground, or can be filled with particles of a paramagnetic material such as carbon or graphite to set up the bond effect on the carbon solids.

Figure 10:
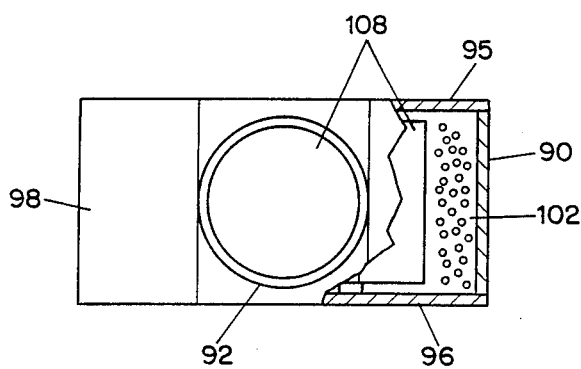
FIG. 10 is a front view of the FIG. 9 embodiment.

In accordance with the embodiment of FIGS. 9-10, exhaust entering the device 90 encounters plate 108, which is at a sufficiently high energy level, e.g. 50 KV DC, to both ionize the molecules and then effect a molecular breakdown as described before. The gas then flows into the collector chamber where carbon atoms form covalent polar bonds with the collector material 106. The remaining $O_2$ ions and atoms pass through the collector and are discharged to atmosphere.

The device shown in FIGS. 9-10 thus operates in a manner similar to the device shown and described in connection with FIGS. 1-8.

In tests to date, there has been no detection of the presence of allotropic forms of oxygen (ozone). In the event that, in any embodiment, ozone was detected in the exhaust, it would be preferable to eliminate such. This may be done, for example in an embodiment such as FIGS. 1-2, by lining the convergent/divergent flow sections with an allotropic absorption layer of a material such as graphite. Also, allotropic diffusion rings may be placed in the flow path between the ion generator housing and the carbon bonding chamber to prevent the collection of oxygen and reduce the potential of a reaction to form $O_3$.

The foregoing represents a description of the preferred embodiment of the invention. Variations and modifications of these embodiments will be apparant to persons skilled in the art, without departing from the inventive concepts disclosed herein. For example, it may be desirable to direct the exhaust flow through an exhaust turbine prior to entering the anti-turbulator chamber. The energy derived from the turbine may be used to boost engine output, or can be used to generate current for powering the electrical fields of the converter. In either case, the resulting decrease in exhaust temperature will act to improve the efficiency of the converter. Also, it is possible to change the configuration of components while still obtaining the desired molecular breakdown and carbon bonding. Further, while the invention has been described for use in connection with the exhaust of an internal combustion engine, it is possible to employ the device to reduce emissions in the exhaust from other combustion processes. In such case, while the dimensions and arrangement of components may need to be altered, the same principles apply. All such modifications and variations are intended to be within the scope of the invention, as defined in the following claims.

We claim:

1. A device for reduction of emissions in the exhaust stream of fossil fuel combustion processes, said device comprising:

an ion generator chamber having non-conductive walls, an inlet means for directing the exhaust stream into said chamber, and a first field generator means disposed within said walls in the path of said exhaust stream;

means for producing a dc positive field in said first field generator means of a field strength sufficient to achieve ionization potential of HC, CO, and $CO_2$ molecules present in the exhaust stream and for inducing molecular breakdown into base components of carbon, hydrogen, and oxygen;

a collector chamber being insulated from ground and being connected to receive the exhaust steam from said ion generator chamber, said collector chamber having a surface means for effecting polar covalent bonding of the carbon ions in the exhaust stream and an outlet for discharging the remainder of said exhaust stream; and an electron transfer chamber having non-conductive walls and being connected upstream of said ion generator chamber, said electron transfer chamber including a second field generator means for providing a dc negative field of strength sufficient to achieve the first ionization level of HC, CO, and $CO_2$ molecules present in the exhaust stream, and means for discharging the ionized exhaust stream to said ion generator chamber.

2. A device according to claim 1, comprising field shunting means connected to said first field generator means for varying the potential over time of the dc positive field.

3. A device according to claim 2, comprising means for connecting the collector chamber surface means to dc positive ground of a voltage substantially less than the potential of the voltage of the first field generator means.

4. A device according to claim 3, comprising diverging nozzle means directly upstream of the first field generator means for directing particulate matter in the exhaust stream in a concentrated stream towards said first field generator means and for diverging the gaseous portion of the stream.

5. A device according to claim 4, wherein the electron transfer chamber is constructed for hydrodynamically conditioning the flow prior to delivery to the ion generator chamber.

6. A converter for use especially in mobile sources for reduction of emissions in the exhaust stream of an internal combustion engine, comprising a housing, wherein said housing defines:

an inlet connectable to the exhaust stream of an engine;

an ion generator chamber communicating with said inlet, said ion generator chamber having non-conductive walls; and a collector chamber having non-conductive walls, being connected to receive the exhaust stream from said ion generator chamber, and having an outlet for discharging the exhaust stream;

wherein said converter further comprises:

a first field generator means disposed within said ion generator chamber in the path of said exhaust stream;

means for providing a dc positive field to said first field generator means of a field strength sufficient to achieve ionization potential of HC, CO, and $CO_2$ molecules present in the exhaust stream and for inducing molecular breakdown into base components of carbon, hydrogen, and oxygen; and wherein said collector chamber is insulated from ground and includes surface means therein for effecting polar covalent bonding of carbon ions in the exhaust stream, said surface means being provided by a paramagnetic material;

means for connecting the collector chamber surface means to dc positive ground of a voltage substantially less than the potential of the voltage of the first generator means; and field shunting means connected to said first field generator means for varying the potential over time of the dc positive field.

7. A converter according to claim 6, wherein said housing further defines an electron transfer chamber, upstream of said ion generator chamber, having non-conductive walls, and said converter includes a second field generator means disposed in said electron transfer chamber, and means for producing a dc negative field in said second field generator means of strength sufficient to achieve the first ionization level of HC, CO, and $CO_2$ molecules in the exhaust stream thereby for discharging said molecules as ions to said ion generator chamber.

8. A converter according to claim 7 comprising means for connecting the collector chamber surface means to dc positive ground of a voltage substantially less than the potential of the voltage of the first field generator means.

9. A converter according to claim 7, comprising field shunting means connected to said first field generator means for varying the potential over time of the dc positive field.

10. A converter according to claim 7, comprising diverging nozzle means directly upstream of the first field generator means for directing particulate matter in the exhaust stream in a concentrated stream towards said first field generator means and for diverging the gaseous portion of the stream.

11. A converter according to claim 10, wherein said electron transfer chamber comprises a conical diverging inlet, a cylindrical chamber portion, and a conical convergent outlet.

12. A convertor according to claim 11, wherein the ion generator chamber includes a conical divergent inlet connected to the convergent outlet of the electron transfer chamber, a cylindrical chamber portion, and a conical convergent outlet.

13. A converter according to claim 13, wherein the collector chamber includes a conical divergent inlet connected to the convergent outlet of the ion generator chamber, a cylindrical chamber portion, and a conical convergent outlet for discharging the exhaust stream.

14. A converter according to claim 13, wherein the first field generator means comprises a series of axially spaced coils, said coils having varying diameter to substantially cover the cross section of the ion generator chamber.

15. A converter according to claim 14, wherein the second field generator means comprises an electron transfer grid, comprising a plurality of pins, disposed in the conical convergent outlet of the electron transfer chamber.

16. A converter according to claim 15, wherein the collector surface means comprises metal collector elements that define a plurality of axial openings for channeling the exhaust stream therethrough.

17. A converter according to claim 16, wherein said collector elements are coated with graphite.

18. A converter according to claim 16, comprising an inlet pipe, upstream of said electron transfer chamber, having heat exchange means for reducing inlet gas temperature.

19. A converter according to claim 16, including an electrical housing mounted on the converter housing for containing means for generating said positive dc field, said negative dc field, and said dc positive ground.

20. A converter according to claim 16, comprising means for measuring an engine operating parameter, and means responsive to said parameter for varying the strength of the positive dc field in the ion generator chamber.

21. A converter according to claim 20, wherein the means for measuring an engine operating parameter comprises oxygen sensor means disposed in said housing in contact with the exhaust stream.

22. A converter according to claim 16, wherein said positive dc field is in the range of 20,000 to 50,000 volts dc.

23. A converter according to claim 22, comprising shunting means for varying said positive field over time.

24. A converter according to claim 22, wherein said negative field is on the order of 12,000 volts dc.

25. A converter according to claim 24, wherein the dc positive ground is on the order of 12 volts.

26. A converter according to claim 16, comprising a plurality of axially arranged flow guides in said electron transfer chamber.

27. A method for reducing emissions in the exhaust stream of fossil fuel combustion processes, comprising the steps of:

directing the stream through a dc negative field of a strength sufficient to induce the first ionization level in the HC, CO, $CO_2$ molecules;

thereafter directing the stream through a dc positive field of sufficient strength to achieve ionization potential of HC, CO, and $CO_2$ molecules present in the exhaust stream to induce molecular breakdown into base components of carbon, hydrogen, and oxygen;

thereafter directing the stream through a collector chamber which is insulated from ground and which has surfaces for effective polar covalent bonding of the carbon ions in the exhaust stream; and thereafter directing the remainder of the exhaust stream to an outlet.

28. A method according to claim 27, comprising the step of shunting the dc positive field over time to vary the field strength.

29. A method according to claim 28, comprising the step, prior to directing the stream into the dc positive field, of hydrodynamically conditioning the stream to achieve laminar flow and compact the particulates in the flow toward a central axis.

30. A method according to claim 29, comprising the step of expanding the stream, as it is directed into the positive dc field, to expand the gaseous portion and such that the particulates enter the field in a dense concentration.

31. A method according to claim 30, comprising the step of connecting the collector surfaces to a dc positive ground.

* * * * *